(12) United States Patent
Stokey (10) Patent No.: US 6,848,869 B2
(45) Date of Patent: Feb. 1, 2005

(54) SPOT AND CHAMFER DRILL INSERT (75) Inventor: Timothy G. Stokey, Dover, OH (US)

(73) Assignee: Allied Machine & Engineering Corp., Dover, OH (US)

( * ) Notice: Subject to any disclaimer, the term of this patent is extended or adjusted under 35 U.S.C. 154(b) by 141 days.

(21) Appl. No.: 10/265,592

(22) Filed: Oct. 7, 2002

(65) Prior Publication Data

US 2004/0067114 A1 Apr. 8, 2004

(51) Int. Cl.[7] .............................................. B23B 51/00
(52) U.S. Cl. ...................... 408/227; 408/224; 408/231; 408/713
(58) Field of Search ................................. 408/223, 224, 408/227, 230, 231, 233, 713

(56) References Cited

U.S. PATENT DOCUMENTS

| 1,221,247 | A | * | 4/1917 | Traylor | 408/224 |
|---|---|---|---|---|---|
| 4,968,193 | A | * | 11/1990 | Chaconas et al. | 408/211 |
| 5,011,342 | A | * | 4/1991 | Hsu | 408/224 |
| 5,259,707 | A | | 11/1993 | Keller | |
| 5,957,635 | A | | 9/1999 | Nuzzi et al. | |
| 6,135,681 | A | * | 10/2000 | Nuzzi et al. | 408/227 |
| 6,220,795 | B1 | | 4/2001 | Matthews | |
| 6,371,702 | B1 | * | 4/2002 | DeWald et al. | 408/227 |
| 6,685,402 | B2 | * | 2/2004 | Mast et al. | 408/227 |
| 2002/0141839 | A1 | * | 10/2002 | McKinley et al. | 408/224 |
| 2004/0001741 | A1 | * | 1/2004 | Mast et al. | 408/233 |

OTHER PUBLICATIONS

Allied Machine & Engineering Corp., "High Performance and Universal Style—Drills, Holders and Accessories," Brochure, 3 pages, (Apr. 2000).
Allied Machine & Engineering Corp., "90° T–A Spot and Chamfer Drill Insert," Brochure, 2 pages, (Nov. 2001).

* cited by examiner

Primary Examiner—A. L. Wellington
Assistant Examiner—Michael W. Talbot
(74) Attorney, Agent, or Firm—Hahn Loeser & Parks, LLP; Robert J. Clark (57) ABSTRACT The present invention relates to a spot and chamfer drill insert which can be utilized to create accurately located spots for subsequent drilling operations while simultaneously providing a chamfer for the finished hole. The present invention utilizes web thin clearance surfaces that are formed at web thin clearance angles, wherein the web thin clearance angles are oriented with respect to a projected plane normal to a plane through the web thin cutting edge and parallel to the longitudinal axis of the insert, wherein the projected plane is tangent to the web thin cutting edge.

18 Claims, 6 Drawing Sheets

SPOT AND CHAMFER DRILL INSERT

TECHNICAL FIELD

The present invention relates generally to a drill having a specialized drill insert for boring holes into metals. More specifically the invention relates to an improved spot and chamfer drill insert which can be utilized to create accurately located spots for subsequent drilling operations while simultaneously providing a chamfer for the finished hole.

BACKGROUND OF THE INVENTION

In typical drilling operations, especially with deep-drilled holes, the hole is first accurately located by using a spot drill. A spot drill improves the positional accuracy of subsequent drilling operations. After the spot drilling operation is complete, a standard drill is used to drill the hole to the desired depth. A third drill is then typically used to put a chamfer on the edge of the drilled hole. Accordingly, the drilled hole requires at least three drill tools, more if the hole must be trued with a boring cutter and/or reamed to size with a reamer. This takes significant time for at least three operations, requires at least three separate tools, and utilizes at least three tool holder positions on the machine.

One attempt to overcome these problems has involved the development of a combination spot and chamfer drill insert. While this insert was able to reduce the number of operations, the spot point of the insert was constructed with clearance surfaces that were formed at a clearance angle from a projected plane normal to the thickness of the insert. These inserts had excessive clearance at the point which increased the length of the chisel edge resulting in unstable cutting requiring increased thrust and generating more heat at the cut. Therefore, there remains a need in the art for a drill tool insert which can reduce the number of drilling operations to complete a finished drilled hole by combining at least two of operations identified above and having an optimized spot point.

SUMMARY OF THE INVENTION

An object of the present invention is to provide a drill insert with an improved point geometry that can provide an accurate spot cut and, if desired, a finish hole chamfer in one operation. These and other advantages are provided by a drill insert comprising a drill insert body having at least a first end opposite a second end and a first face side opposite a second face side; wherein the first end of the drill insert body is a generally planar surface and the second end has at least two main cutting edges formed thereon at a first inclusive angle, a web formed between the two main cutting edges, and a web thinning notch formed on either side of the web, forming web thinning cutting edges at a second inclusive angle and separated from each other by a chisel; wherein the chisel is formed by the intersection of at least a primary web thin clearance surface behind each web thinning cutting edge; wherein the primary web thin clearance surface is formed at a primary web thin clearance angle with respect to a projected plane normal to a plane through the web thin cutting edge and parallel to the longitudinal axis of the insert, wherein the projected plane is tangent to the web thin cutting edge.

These and other advantages are also provided by a drilling tool assembly comprising: (1) a holder having first and second ends and a rotational axis, wherein the second end is adapted to be fixedly attached in a drilling machine, and the first end comprises a holder slot having a bottom seating surface over at least a portion of the holder slot, the holder slot also including a locating boss extending from the bottom seating surface; (2) a drill insert comprising a drill insert body having at least a first end opposite a second end and a first face side opposite a second face side, wherein the first end of the drill insert body is a generally planar surface and the second end has at least two main cutting edges formed thereon at a first inclusive angle, a web formed between the two main cutting edges, and a web thinning notch formed on either side of the web forming web thinning cutting edges at a second inclusive angle and separated from each other by a chisel, wherein the chisel is formed by the intersection of at least a primary web thin clearance surface behind each web thinning cutting edge, wherein the primary web thin clearance surface is formed at a primary web thin clearance angle with respect to a projected plane normal to a plane through the web thin cutting edge and parallel to the longitudinal axis of the insert, wherein the projected plane is tangent to the web thin cutting edge; and (3) wherein the first side of the insert is adapted to have at least a portion thereof positioned in the holder slot in seating engagement with the bottom seating surface and including a locating slot formed in the bottom side which cooperates with the locating boss of the bottom seating surface to allow the insert to be seated against the bottom seating surface.

BRIEF DESCRIPTION OF THE DRAWINGS

The invention and developments thereof are described in more detail in the following by way of embodiments with reference to the drawings, in which.

DETAILED DESCRIPTION OF THE INVENTION

Figure 1:
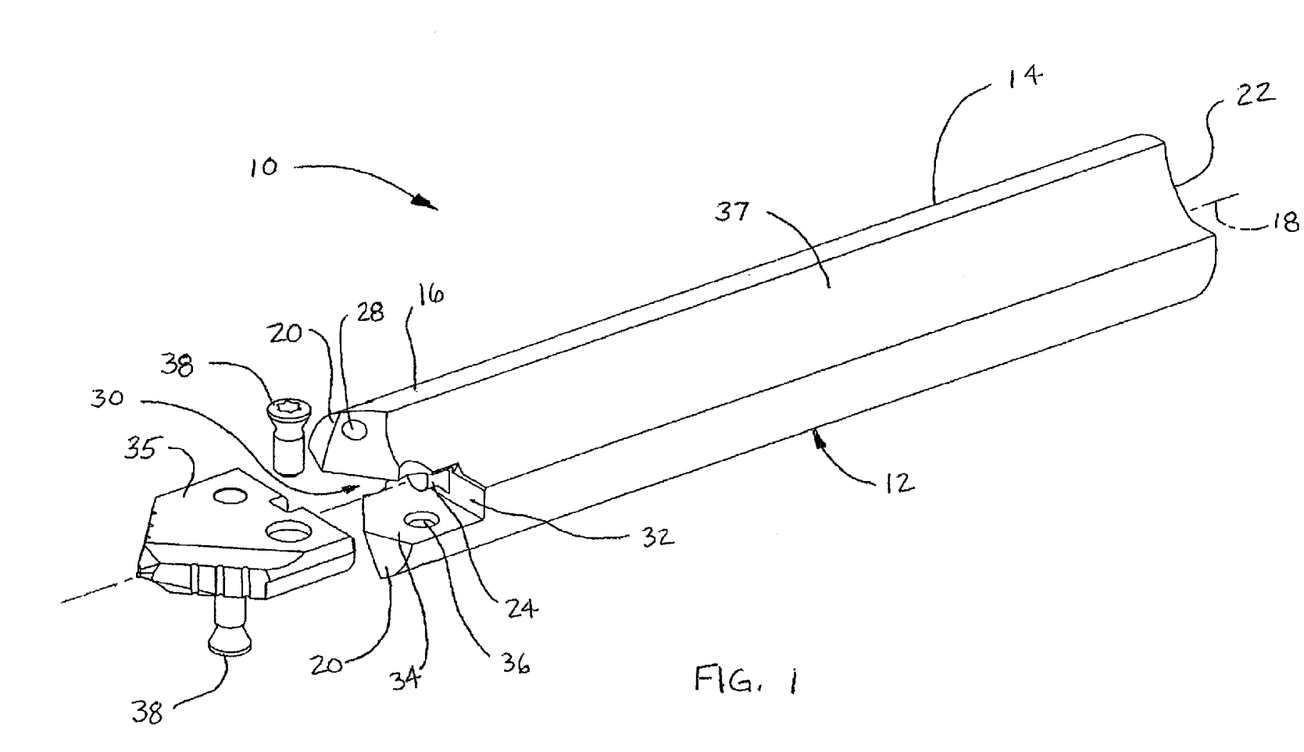
FIG. 1 is an exploded assembly view of the drill tool assembly according to a preferred embodiment.
Figure 2:
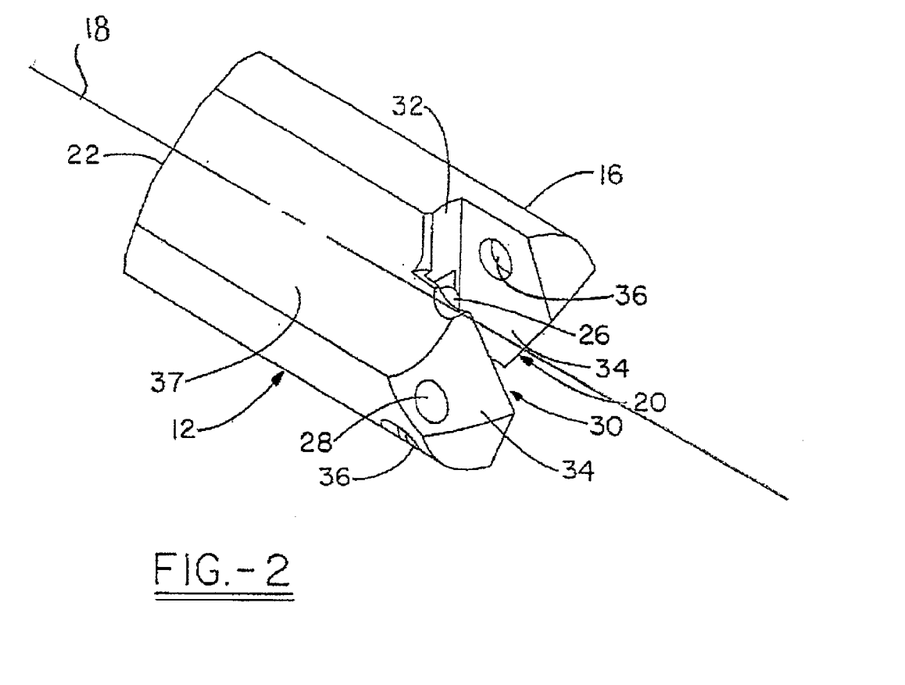
FIG. 2 is a partial perspective view of the holder associated with the assembly.

Turning now to a preferred embodiment of the invention, FIG. 1 illustrates a drill tool assembly 10 generally indicated. Drill tool assembly 10 comprises a holder 12, which has a body 14 and head portion 16 associated therewith. In the preferred embodiment, holder 12 has, in general, a cylindrical shape with a first end 20 and second end 22. As also shown in FIG. 2, the first end 20 of holder 12 has a clamping or holder slot 30, which may extend across the entire diameter of the head portion 16 or, at least, over a center portion thereof at the general location of the rotational axis 18 of holder 12. The holder slot 30 has a bottom wall 32 positioned in substantially perpendicular orientation relative to the rotational axis 18 of the holder 12. In the preferred embodiment, the assembly 10 may further include a locating boss or dowel pin 24, which is positioned precisely with respect to the axis 18 and extends from the bottom wall 32 of the holder slot 30. The pin 24 may be positioned within a hole 26 extending downwardly from the bottom wall 32 of slot 30 along the axis 18 of the holder body in a press fit relationship to position pin 24 as best shown in FIG. 1. Alternatively, the locating boss, which, in the preferred embodiment, comprises pin 24, may be configured in another manner to achieve the corresponding functionality of pin 24, such as an integral member extending from bottom wall 32. Within the holder slot 30, a drill insert 35 is precisely positioned with respect to the holder 12 to perform the desired drilling function in conjunction therewith. As will be hereinafter described in more detail, the insert 35 has a point geometry comprising a plurality of cutting surfaces, which are precisely positioned with respect to the axis 18 of the holder 12 to minimize errors in a resulting drilling operation using assembly 10.

More particularly, the preferred embodiment of holder 12 is shown in FIG. 2, and may be configured to include at its first end 20 a pair of clamping arms 34, which extend about holder slot 30. The clamping arms 34 preferably include apertures 36, which accommodate screws 38 (see FIG. 1) to secure the drill insert 35 in its position within the holder slot 30. In the preferred configuration, the holes 36 are threaded to engage screws 38, and mate with screw holes formed in the drill insert 35 in a predetermined manner to precisely locate the drill insert in a predetermined location within holder slot 30, as will be described in more detail. Each of the clamp arms 34 may also include a lubrication vent 28, which allows the application and flow of lubrication adjacent the cutting surfaces of the drill insert to facilitate the drilling operation. The clamp arms 34 may also include angled or curved surfaces, which facilitate chip removal via chip evacuating grooves 37 on each side of the holder 12. The seating surface 32 is also shown to be designed as a planar surface, which corresponds to the planar bottom portion of the preferred drill insert 35, although another configuration of bottom surface 32 may be employed and is contemplated herein.

Turning to FIGS. 4A–4D, a first embodiment of the drill insert 35 is shown. The drill insert 35 may form a spade drill blade, comprising an insert body having opposing face sides 75, a leading end 73 and a base end 77. Insert 35 also comprises apertures 70 which allow the insert 35 to be secured to the holder 12 by screws 38. Base end 77 is a generally planar surface having a recess 65 formed therein to mate with pin 24 of the holder 12. The insert body also has opposing side edges 60 being generally parallel with the rotational axis 18 of the holder 12 once the insert 35 is positioned and secured with holder 12. When secured with holder 12, drill insert 35 will also have a rotational axis, which desirably is coaxial with axis 18 of holder 12. The drill insert 35 will also have a width 61, which, upon being rotated with holder 12, forms an outside diameter of the assembled tool. The drill insert 35 further includes main cutting edges 64 on leading end 73 formed at a V-shaped first inclusive angle $\Phi$, with cutting edges 64 on each side of the axial center 62, also known as the dead center. The first inclusive angle $\Phi$ is shown at about 90 degrees which produces a conical cut in the work piece. Although not shown, the present invention may also include main cutting edges 64 having any included angle $\Phi$ which produces a desired conical cut such as, but not limited to, common chamfer/countersink included angles of 60 and 82 degrees. The main cutting edges 64 may include a plurality of cutting components, which cooperate together to provide the desired cutting surface 64 for the material and/or drilling application. In general, the insert 35 is designed to cut when rotationally driven in conjunction with holder 12 in a predetermined direction, and is not reversible, although such drilling blade configurations are known to those skilled in the art and could be used in conjunction with the present invention if desired.

Figure 6A:
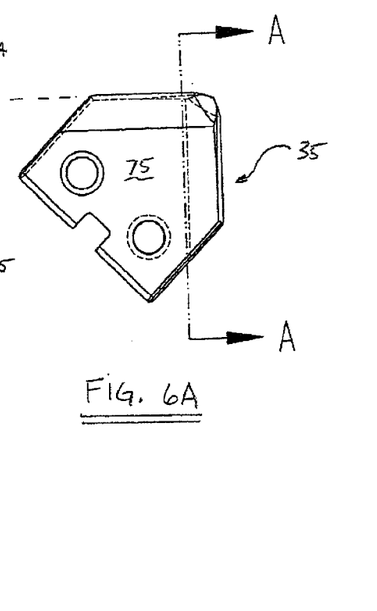
FIGS. 6A–6B are a face side elevational view and a cross-sectional view of the insert, respectively, with the cross-section taken perpendicular to the insert face and through a portion of a main cutting edge.
Figure 6B:
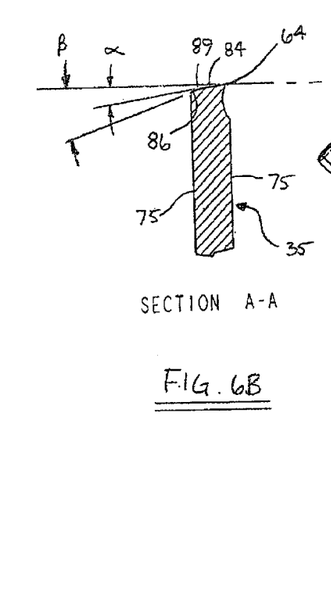

Referring now to FIG. 6B which is a cross-sectional view perpendicular to the face surfaces 75 of insert 35 through a portion of the cutting edge 64 as shown in the face side elevational view of FIG. 6A. Insert 35 further comprises a primary clearance surface 84 behind each cutting edge 64 which is formed at a primary clearance angle $\alpha$ such that only the cutting edges 64 are in contact with the material to be cut. A secondary clearance surface 86 may also be formed adjacent the primary clearance surface 84 at a secondary clearance angle $\beta$ to provide additional clearance behind the cutting edges 64. The primary and secondary clearance angles, $\alpha\beta$ are oriented from a plane projected normal to a face surface 75 of the insert and tangent to the respective main cutting edge 64. The interface between the primary and secondary clearance surfaces is referred to as the clearance cut 89. The clearance cut 89 is typically either parallel or transverse to the cutting edges 64. The clearance surfaces 84, 86 prevent additional friction during the cutting operation and provide additional room for facilitating the removal of chips cut from the material.

Figure 3:
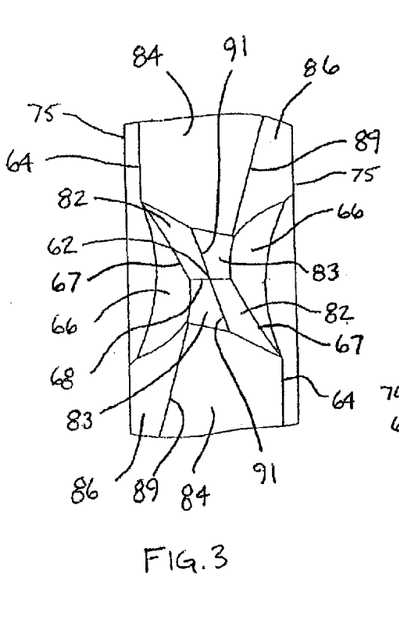
FIG. 3 is a top plan detail view of the point of the insert of the present invention.
Figure 4A:
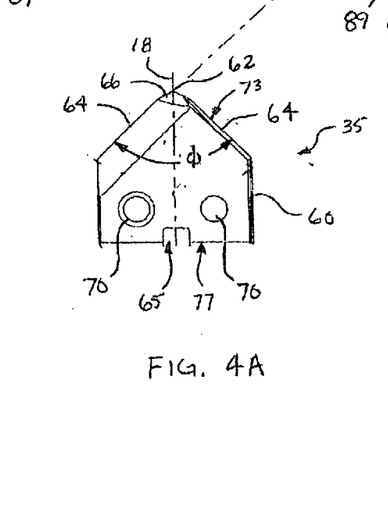
FIGS. 4A, 4B, 4C, and 4D are a variety of different views of an insert according to a first embodiment of the present invention.
Figure 4B:
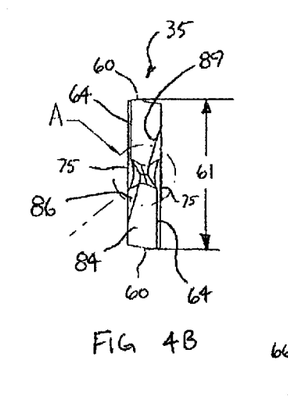
Figure 4C:
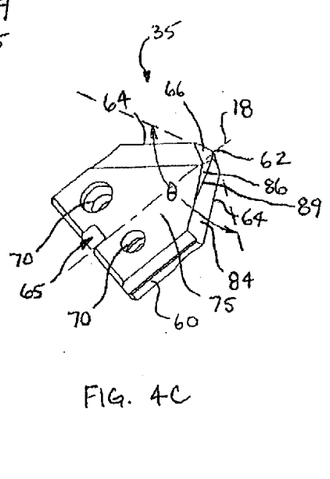
Figure 4D:
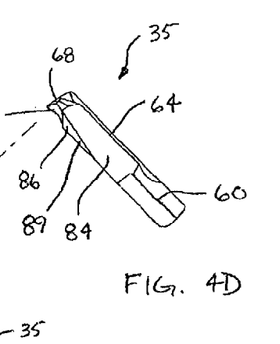
Figures 5A, 5B, 5C, 5D:
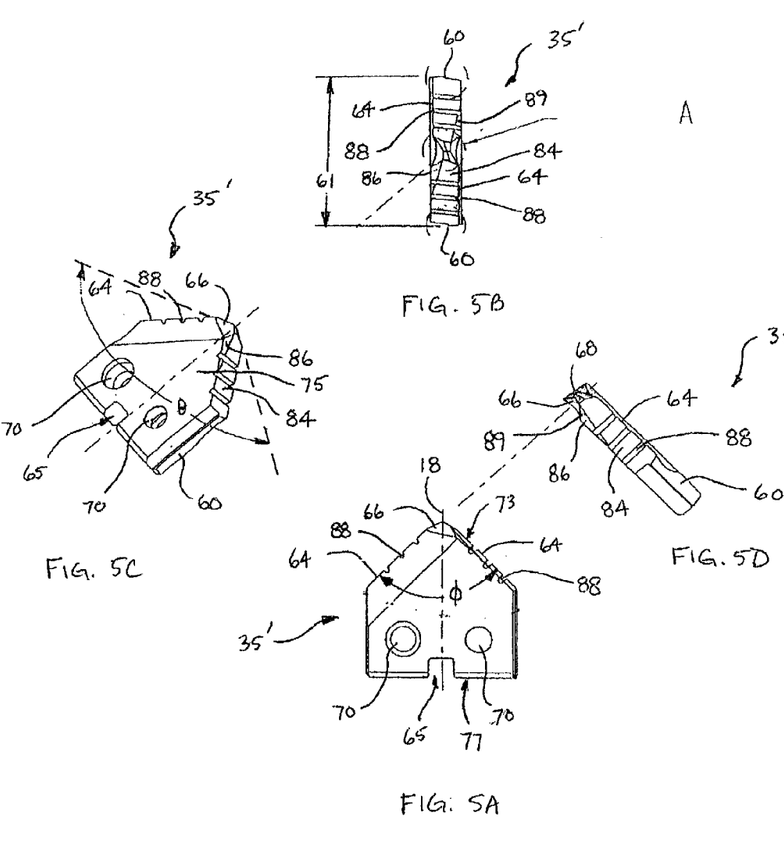
FIGS. 5A, 5B, 5C, and 5D are a variety of different views of an insert according to a second embodiment of the present invention having chipbreakers.

Insert 35 also includes a web thinning notch 66 as best shown in FIG. 3. Notch 66 is located on either side of the chisel 68 which is formed across the insert web and extends through axial center 62. The web thinning notch 66 forms web thinning cutting edges 67 which provide the transition from the main cutting edges 64 to the chisel 68. The web thinning cutting edges 67 may be formed at a second included angle $\theta$, shown as an obtuse angle, but not limited thereto. The second included angle $\theta$ is larger than the first included angle $\Phi$. The larger web thin included angle $\theta$ aides in strengthening the point of the insert 35. The notch 66 forms a type of flute on either side of insert 35, which reduces the web and length of chisel 68. This reduces the thrust needed when drilling by reducing the length of the chisel 68. It is also contemplated that the notch 66 may be of the V-notch type disclosed in the co-owned pending U.S. patent application Ser. No. 09/975,221, entitled DRILL INSERT GEOMETRY HAVING V-NOTCHED WEB, herein incorporated by reference.

Many prior art drill inserts have a flat chisel. With a flat chisel there is a tendency for the drill to walk around the chisel during drilling operations resulting in runout and wander of the drilled hole. Another negative feature of drill inserts and twist drills, in general, is that the flat chisel must act as a cutting edge. The chisel typically has a neutral or negative rake angle, which does not cut efficiently but rather deforms the metal. This flat chisel and the neutral or negative rake angle result in high thrust forces being required and excessive heat being developed at the point. In the present invention, the chisel 68 is typically formed as a multi-faceted chisel point 68 forming a single point at the dead center 62. The point 62 of the multi-faceted chisel 68 point is not as apt to wander as a flat chisel and provides increased stability, which in turn helps produce very round and very accurately positioned spot cuts.

In typical prior art inserts having a multi-faceted chisel point, the facet surfaces are formed by the intersections of a primary and a secondary clearance surface on both sides of the insert, meeting at the chisel. As described with respect to the present invention, the primary and secondary clearance surfaces are formed at clearance angles which are conventionally measured from a plane projected perpendicular from the face sides 75 of the insert 35 and tangent to the respective main cutting edges 64. However, in the present invention, the primary and secondary clearance surfaces 84, 86, do not extend to chisel 68. The multi-faceted chisel 68 is formed from web thin primary clearance surfaces 82 and web thin secondary clearance surfaces 83 formed behind web thin cutting edges 67.

While the prior art spot and chamfer drill also had web thin clearance surfaces, those surfaces were oriented from a projected plane normal to the face of the insert. This meant that the prior art web thin clearance surface was the resultant angle of the clearance angle and point included angle. Accordingly, the prior art spot and chamfer tool provided a less stable point with too high of a clearance behind the web thin cutting edges resulting in an increased chisel length.

Figure 7A:
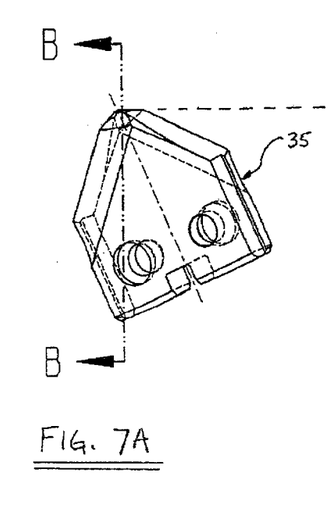
FIGS. 7A, 7B, and 7C are a rotated perspective view, a corresponding cross-sectional view of the insert taken at an angle generally perpendicular to the web thin cutting edge and through a portion of a web thin cutting edge, and a detail cross-sectional view of the web thin cutting edge clearance surfaces.
Figure 7B:
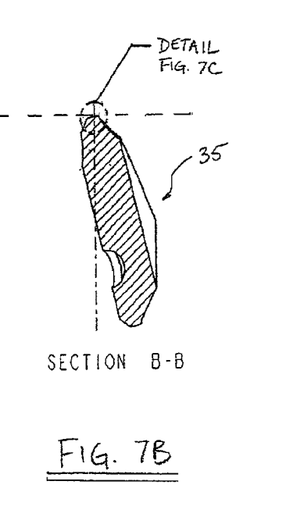
Figure 7C:
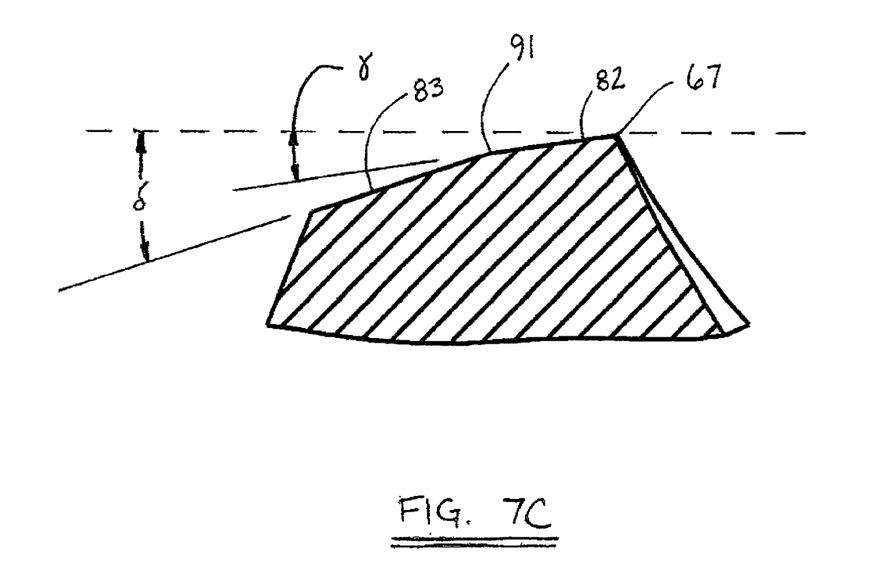

Referring now to FIGS. 7A–7C, FIG. 7B is a cross-sectional view of insert 35 taken perpendicular to the web thin cutting edge 67 as shown in the perspective view of FIG. 7A. FIG. 7C provides a detail view of the top portion of the cross-section of FIG. 7B. In the present invention, the web thin primary and secondary clearance surfaces 82, 83 are formed at primary and secondary web thin clearance angles γ, 67, respectively, which are orientated from a projected plane normal to a plane through cutting edge 67 which is parallel to the longitudinal axis 18 of the tool, wherein the projected plane is tangent to the web thin cutting edge 67. Basing the web thin clearance surfaces 82, 83 off of the web thin cutting edge allows the clearance to be optimized along the entire length of the web thin cutting edges 67. As best shown in FIG. 3, web thin clearance surfaces 82, 83 are radially outwardly bounded by at least one of the primary clearance surface 84 and secondary clearance surface 86 and are each also bounded by chisel 68 and by web thin cutting edges 67. The web thin clearance surfaces 82, 83 are also bounded from each other by a central intersection line 91, bisecting the chisel 68 at the dead center 62 and extending radially outward to at least one of the primary clearance surface 84 and secondary clearance surface 86. The central intersection line 91 may be either parallel or transverse to the cutting surfaces 67, however the central intersection line 91 is offset from any clearance cut 89 such that the two are transverse to each other. The orientation of web thin clearance surfaces 82 and 83 to web thin cutting edge 67 (formed at an included angle θ which is larger than the included angle Φ of cutting edges 64), enable less material to be removed from the web resulting in a stronger drill point. The web thin clearance surfaces 82, 83 provide a reduced clearance angle at the web cutting edge 67, which provides increased stability which helps produce a very accurate spot cut. Web thin clearance surface 82 and 83 reduce the length of chisel 68, forming it generally perpendicular to the main cutting edges 64 of the insert 35, although the present invention is not limited to such a configuration. The multi-faceted chisel 68 of the present invention allows the insert 35 to penetrate into the workpiece in a more aggressive fashion, which results in higher feed rates and increased stability while, at the same time, creating less heat generated at the tip of the insert 35.

In the point geometry configuration of the present invention as shown in FIG. 3, the chisel 68 may be generally perpendicular to the main cutting edge 64 that precedes it, next to the cutting edge of the notch 66. This configuration provides an easy exit path for the material plowed up ahead of each side of the chisel edge 68, which can flow down the clearances surfaces 83, adjacent the associated cutting edge 67 and into the adjacent web-thinning notch 66.

Another embodiment of the present invention is shown in FIGS. 5A–5D. A drill insert 35' is shown which is similar to drill insert 35 except for the addition of chipbreakers 88 to the main cutting edges 64 of the drill insert. The chipbreakers 88 aid in the formation and removal of chips during the drilling process.

It is contemplated that the drill insert is made of high speed steel. However, the drill insert may also be comprised of a sintered metallic hard material such as carbide, cermet, ceramic, monocrystalline and polycrystalline diamond, or boron nitride.

Although the present invention has been described above in detail, the same is by way of illustration and example only and is not to be taken as a limitation on the present invention. It is contemplated that changes could be made to the embodiments shown without going beyond the scope of the invention. For example, a flat chisel formed by only primary web thin clearance surfaces in accordance with the present invention could be substituted for a multi-faceted chisel. Accordingly, the scope and content of the present invention are to be defined only by the terms of the appended claims.

What is claimed is:

1. A drill insert comprising:
    a drill insert body having at least a first end opposite a second end and a first face side opposite a second face side;
    wherein the first end of the drill insert body is a generally planar surface and the second end has at least two main cutting edges formed thereon at a first inclusive angle,
    a web formed between the two main cutting edges, and
    a web thinning notch formed on either side of the web, forming web thinning cutting edges at a second inclusive angle and separated from each other by a chisel;
    wherein the second inclusive angle is larger than the first inclusive angle;
    wherein the chisel is formed by the intersection of at least a primary web thin clearance surface behind each web thinning cutting edge;
    wherein the primary web thin clearance surface is formed at a primary web thin clearance angle with respect to a projected plane normal to a plane through the web thin cutting edge, wherein the plane through the web thin cutting edge is parallel to the longitudinal axis of the insert, wherein the projected plane is tangent to the web thin cutting edge.

2. The drill insert of claim 1 wherein the chisel is a multifaceted chisel formed by the primary web thin clearance surface and a secondary web thin clearance surface behind each web thinning cutting edge;
    wherein the secondary web thin clearance surface is formed at a secondary clearance angle with respect to a projected plane normal to a plane through the web thin cutting edge, wherein the plane through the web thin cutting edge is parallel to the longitudinal axis of the insert, wherein the projected plane is tangent to the web thin cutting edge.

3. The drill insert of claim 2, wherein the primary web thin clearance surface and the secondary web thin clearance surface meet at an intersection line extending substantially through the center of the chisel.

4. The drill insert of claim 3, wherein the intersection line is transverse to the main cutting edges.

5. The drill insert of claim 1, wherein the first inclusive angle is about 90 degrees.

6. The drill insert of claim 1 further comprising at least one primary clearance surface trailing each of the at least two main cutting edges formed at a primary clearance angle with respect to a projected plane normal to the first insert face side and tangent to the respective main cutting edge.

7. The drill insert of claim 1 further comprising a primary clearance surface and a secondary clearance surface trailing each of the at least two main cutting edges formed at a primary clearance angle and a secondary clearance angle, respectively, with respect to a projected plane normal to the first insert face side and tangent to the respective main cutting edge.

8. The drill insert of claim 6, wherein each primary clearance surface is bounded radially inward by at least the primary web thin clearance surface.

9. The drill insert of claim 1, wherein at least one of the at least two cutting edges has a chipbreaker formed thereon.

10. The drill insert of claim 1, wherein the drill insert body is comprised of high speed steel.

11. The drill insert of claim 1, wherein the drill insert body is comprised of a sintered metallic hard material.

12. The drill insert of claim 1, wherein the drill insert body is comprised of a material selected from the group consisting of carbide, cermet, ceramic, monocrystalline and polycrystalline diamond, and boron nitride.

13. The drill insert of claim 1 further comprising a locating slot formed in the generally planar surface of the first end of the drill insert body.

14. The drill insert of claim 1 further comprising at least one aperture formed through the drill insert body.

15. The drill insert of claim 1, wherein each primary web thin clearance surface intersects the corresponding web thin cutting edge from the chisel to the corresponding main cutting edge.

16. A drill insert comprising:
a drill insert body having at least a first end opposite a second end and a first face side opposite a second face side;
wherein the first end of the drill insert body is a generally planar surface and the second end has at least two main cutting edges formed thereon at a first inclusive angle,
at least one primary clearance surface trailing each of the at least two main cutting edges formed at a primary clearance angle with respect to a projected plane normal to the first insert face side and tangent to the respective main cutting edge;
a web formed between the two main cutting edges, and
a web thinning notch formed on either side of the web, forming web thinning cutting edges at a second inclusive angle wherein the second inclusive angle is larger than the first inclusive angle, and seperated from each other by a chisel;
wherein the chisel is a multi-faceted chisel formed by the intersection of a primary web thin clearance surface and a secondary web thin clearance surface behind each web thinning cutting edge;
wherein the primary web thin clearance surface is formed at a primary web thin clearance angle with respect to a projected plane normal to a plane through the web thin cutting edge, wherein the plane through the web thin cutting edge is parallel to the longitudinal axis of the insert, wherein the projected plane is tangent to the web thin cutting edge;
wherein the secondary web thin clearance surface is formed at a secondary web thin clearance angle with respect to a projected plane normal to a plane through the web thin cutting edge, wherein the plane through the web thin cutting edge is parallel to the longitudinal axis of the insert, wherein the projected plane is tangent to the web thin cutting edge.

17. A drilling tool assembly comprising:
a holder having first and second ends and a rotational axis, wherein the second end is adapted to be fixedly attached in a drilling machine, and the first end comprises a holder slot having a bottom seating surface over at least a portion of the holder slot, the holder slot also including a locating boss extending from the bottom seating surface,
a drill insert comprising a drill insert body having at least a first end opposite a second end and a first face side opposite a second face side, wherein the first end of the drill insert body is a generally planar surface and the second end has at least two main cutting edges formed thereon at a first inclusive angle, a web formed between the two main cutting edges, and a web thinning notch formed on either side of the web forming web thinning cutting edges at a second inclusive angle wherein the second inclusive angle is larger than the first inclusive angle, and separated from each other by a chisel, wherein the chisel is formed by the intersection of at least a primary web thin clearance surface behind each web thinning cutting edge, wherein the primary web thin clearance surface is formed at a primary web thin clearance angle with respect to a projected plane normal to a plane through the web thin cutting edge, wherein the plane through the web thin cutting edge is parallel to the longitudinal axis of the insert, wherein the projected plane is tangent to the web thin cutting edge; and
wherein the first side of the insert is adapted to have at least a portion thereof positioned in the holder slot in seating engagement with the bottom seating surface and including a locating slot formed in the bottom side which cooperates with the locating boss of the bottom seating surface to allow the insert to be seated against the bottom seating surface.

18. The drilling tool assembly of claim 17 wherein the chisel is a multifaceted chisel formed by the primary web thin clearance surface and a secondary web thin clearance surface behind each web thinning cutting edge;
wherein the secondary web thin clearance surface is formed at a secondary clearance angle with respect to a projected plane normal to a plane through the web thin cutting edge, wherein the plane through the web thin cutting edge is parallel to the longitudinal axis of the insert, wherein the projected plane is tangent to the web thin cutting edge.

* * * * *